US010329149B2

(12) United States Patent
Manousiouthakis et al.

(10) Patent No.: US 10,329,149 B2
(45) Date of Patent: Jun. 25, 2019

(54) ENERGETICALLY ENHANCED REFORMING PROCESS (71) Applicant: THE REGENTS OF THE UNIVERSITY OF CALIFORNIA, Oakland, CA (US)

(72) Inventors: Vasilios I. Manousiouthakis, Los Angeles, CA (US); Abdulrahman M. Albassam, Los Angeles, CA (US); Jeremy A. Conner, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 15/202,411

(22) Filed: Jul. 5, 2016

(65) Prior Publication Data

US 2017/0001862 A1 Jan. 5, 2017

Related U.S. Application Data (60) Provisional application No. 62/187,923, filed on Jul. 2, 2015.

(51) Int. Cl.
C01B 3/24 (2006.01)
C01B 3/34 (2006.01)
(Continued)

(52) U.S. Cl.
CPC .............. *C01B 3/34* (2013.01); *C01B 3/36* (2013.01); *C01B 32/40* (2017.08);
(Continued)

(58) Field of Classification Search
CPC ........ C01B 2203/04; C01B 2203/0405; C01B 2203/041; C01B 2203/0415;
(Continued)

(56) References Cited

U.S. PATENT DOCUMENTS

| 7,238,333 | B2 * | 7/2007 | Faur-Ghenciu | .......... | B01J 23/63 |
| | | | | | 423/247 |
| 2012/0131898 | A1 * | 5/2012 | Mokheimer | .............. | F02C 1/05 |
| | | | | | 60/39.12 |

(Continued)

*Primary Examiner* — Amber R Orlando
*Assistant Examiner* — Syed T Iqbal
(74) *Attorney, Agent, or Firm* — O'Banion & Ritchey LLP; John P. O'Banion (57) ABSTRACT Methods and systems for producing hydrogen from methane or other fuels that has lower input heat requirements than conventional steam reformation schemes are provided. The system has a reactor with a controlled feed of fuel, water/steam, CO and recycle gases. The methods generally use significantly high amounts of steam (water) and carbon monoxide (CO) in the feed that substantially enhances the reaction rate of the water-gas shift reaction, which transforms CO and $H_2O$ to $CO_2$ and $H_2$. Since this reaction is exothermic, its enhancement alters the endothermic nature of the overall reforming process to the point where the overall reforming process is no longer endothermic. The CO requirements may be met in part with the reverse water-gas shift reaction from $CO_2$ produced by the reactor. The lower heat requirements may be satisfied with renewable sources such as solar or from hydrogen produced by the system.

7 Claims, 3 Drawing Sheets (51) Int. Cl.
*C01B 3/36* (2006.01)
*C01B 32/40* (2017.01)

(52) U.S. Cl.
CPC ............... *C01B 2203/0216* (2013.01); *C01B 2203/0255* (2013.01); *C01B 2203/0475* (2013.01); *C01B 2203/0495* (2013.01); *C01B 2203/066* (2013.01); *C01B 2203/0822* (2013.01); *C01B 2203/1241* (2013.01)

(58) Field of Classification Search
CPC ...... C01B 2203/042; C01B 2203/0425; C01B 2203/043; C01B 2203/0435; C01B 2203/044; C01B 2203/0445; C01B 2203/045; C01B 2203/0455; C01B 2203/0456; C01B 2203/0465; C01B 2203/0283; C01B 2203/1241; C01B 2203/0233
See application file for complete search history.

(56) References Cited

U.S. PATENT DOCUMENTS

2014/0178278 A1* 6/2014 Siskin ................ B01D 53/1425
423/228
2016/0318824 A1* 11/2016 Steynberg ........... C07C 29/1518

* cited by examiner

ENERGETICALLY ENHANCED REFORMING PROCESS

CROSS-REFERENCE TO RELATED APPLICATIONS

This application claims priority to, and the benefit of, U.S. provisional patent application Ser. No. 62/187,923 filed on Jul. 2, 2015, which is incorporated herein by reference in its entirety.

STATEMENT REGARDING FEDERALLY SPONSORED RESEARCH OR DEVELOPMENT

This invention was made with Government support under 0829211, awarded by the National Science Foundation and DE-EE0005763, awarded by the U.S. Department of Energy. The Government has certain rights in the invention.

INCORPORATION-BY-REFERENCE OF COMPUTER PROGRAM APPENDIX

Not Applicable

BACKGROUND

1. Technical Field

The present technology pertains generally to gas production systems and methods, and more particularly to an improved hydrogen gas steam reformation system that is energy and cost efficient and does not require burning of fossil fuels for heat.

2. Background Discussion

Worldwide population growth and industrial expansion has produced a dramatic increase in the consumption of oil and other fossil fuels. Global emissions from fossil fuels have had a substantial impact on the environment. Hydrogen is a promising alternative to the use of fossil fuels that may mitigate the deleterious effects of burning hydrocarbons and limited fossil fuel supplies.

Hydrogen fuel can react with oxygen to release energy in engines to produce water rather than greenhouse gases. Fuel cells are a developed technology that directly converts the chemical energy of the hydrogen fuel into electricity and heat without involving combustion. A fuel cell is an electrochemical device with an anode and a cathode separated by a thin layer of electrolyte. Typically, hydrogen reacts in a fuel cell on the anode side and oxygen gas or air reacts on the cathode side. Fuel cells can produce electrical energy continuously as long as fuel and an oxidant are provided to the electrodes.

Compared to conventional combustion methods of producing electricity, hydrogen based fuel cells are considered to be attractive alternative because of zero-emissions and high efficiency. Unfortunately, hydrogen fuel for fuel cells is not naturally occurring as a collectable gas and it must be generated from a secondary source. Approximately 95% of the hydrogen produced today comes from carbon based raw materials, such as methane or natural gas. However, it is difficult to use fuel cells in many applications due to the lack of ready available hydrogen, storage and distribution infrastructure.

The overall profitability of fuel cells for producing energy is nearly double that of a conventional fossil fuel combustion engine making them attractive producers even if the hydrogen is obtained from methane or other fossil fuels. In addition to the production of electricity, hydrogen can be used as a chemical feedstock for petrochemical, food, electronics and metallurgical processing industries. For example, hydrogen can be used in refineries as raw material for the hydrocracking of oil associated with gasoline production. Hydrogen is also envisioned to be an energy carrier for vehicular transportation through its use in hydrogen fuel-cell-powered cars.

In the short term, increased production of hydrogen gas will be with the use of conventional technologies, such as natural gas reforming. Catalytic steam reformation of methane is a well-known, commercially available process for the production of hydrogen. Typical hydrogen production is accomplished through several steps: steam reforming, water gas shift reaction, and hydrogen purification. However, carbon is converted to $CO_2$ that is ultimately released to the atmosphere with these processes and therefore alternatives to the atmospheric release of $CO_2$ must be created.

Steam reforming of natural gas and other light hydrocarbons is currently the most economical process for hydrogen production. The most common method of producing commercial bulk hydrogen is methane steam reforming (MSR), that has an overall reaction of $CH_4 + 2H_2O = CO_2 + 4H_2$. The steam reforming process is typically carried out industrially at around 1100K and the process is highly endothermic. The initial steam reforming reaction of $CH_4 + H_2O \leftrightarrow CO + 3H_2 \Delta h = +206.16$ $kJmol^{-1}$ $CH_4$ is endothermic and requires an input of external heat. Combustion of a portion the natural gas feedstock and waste gases from the hydrogen purification system are often used to produce the external heat load that is required in order to drive the reaction.

After reforming, the resulting gasses are sent to one or more shift reactors, where the hydrogen output is increased with the use of the water-gas shift reaction $CO + H_2O = CO_2 + H_2 \Delta H2 = -41.15$ $kJmol^{-1}$ CO that is exothermic. Typically, this shift reaction can take place in two stages and reactors. The first stage takes place in a high temperature shift reactor followed by a second stage in a low temperature shift reactor. The gases emerging from the shift reactors contain predominantly hydrogen with small quantities of $H_2O$, $CO_2$, $CH_4$ and CO. The hydrogen is then purified from the reactor gases by available purification schemes. For example, pressure swing absorption (PSA) systems or catalysts like palladium membranes can be used to purify the hydrogen.

It can be seen that the high endothermic heat load makes methane steam reformation a capital and operating cost intensive process. A reduction or elimination of the high endothermic heat load of the process would improve the economics of this process considerably. To this end, a commonly employed method is autothermal reforming, where oxygen is injected into the reforming mixture, leading to significant reduction, or even possible elimination of the aforementioned heat load. This approach, however, is not widely practiced due to its inherent safety concerns (oxygen/hydrogen mixtures have a wide explosive range) and the need for an air separation subsystem which will provide the oxygen needed for the autothermal reforming process.

Accordingly, there is a need for systems and methods for hydrogen production that has a reduced heat load so that the associated system costs are greatly reduced. In addition, there is a need to incorporate renewable energy resources to possibly supply either all or part of this heat load. The present technology satisfies these needs and is generally an improvement in the art.

BRIEF SUMMARY

The economic value of steam methane reforming in modern refineries is high due to the dire need of hydrogen for hydro-treating and hydrocracking processes. Aside from its demand in petroleum refining applications, the demand for hydrogen is also expanding world-wide due to the ever increasing use of fuel cells and hydrogen fuel cell cars.

The process of producing hydrogen through reforming of small organic molecules consists mainly of reacting these molecules with steam or carbon dioxide at high temperature. The process requires a large endothermic heat load which is provided in large furnaces surrounding metallic tubes that contain the reacting mixture and reaction rate enhancing catalysts. The uniform and energy efficient operation of these furnaces represents a major challenge for process operators. By reducing or eliminating this endothermic heat load, the energetic characteristics of the process can be significantly improved. For example if the endothermic heat load (i.e. hot utility) is eliminated altogether, then the furnace itself may be eliminated. In addition, if no hot utility is required at the reformer's high operating temperatures, alternative, possibly renewable energy sources could possibly be used to carry out the overall reforming operations. This is illustrated in some of the presented case studies, where the temperature where external energy is needed (770K) is low enough to be provided by solar trough concentrators.

An alternative reforming process is described which overcomes the highly-endothermic nature of reforming in the art. In one embodiment, this is accomplished by introducing into the reformer feed significantly higher amounts of steam (water) and significant amounts of carbon monoxide (CO).

Four design case studies were carried out to illustrate the general principles. They all involve steam reforming of methane and they demonstrate various levels of endothermicity (fully endothermic, partially endothermic, and even exothermic). The attributes of each design are listed in a summary table for easy comparison.

A baseline case study and four case studies are presented as embodiments of the technology. From this information, one of ordinary skill in the art will readily understand how numerous other possible realizations can be pursued. Case 1 is a baseline design of the reforming process aiming to represent current industrial practice. It employs a highly endothermic reformer, and requires no external energy use, except for energy resources developed from the natural gas feed itself. As a result, it produces only 2.6 moles of $H_2$ per mole of fed $CH_4$, although the stoichiometric ratio is 4 moles $H_2$ per mole of $CH_4$. Case 2 illustrates the new reforming method in an operating mode where the reformer is slightly exothermic. This flowsheet requires external energy use, albeit at a much lower temperature than the reformer operation of Case 1. As a result, it produces exactly the stoichiometric ratio of 4 moles of $H_2$ per mole of fed $CH_4$. It also considers that the minimum work of separation is needed to carry out the $H_2$ and $CO_2$ purification steps. Case 3 illustrates the new reforming method in an operating mode where the reformer is again slightly exothermic. This flowsheet requires no external energy use, but it produces only 3.1 moles of $H_2$ per mole of fed $CH_4$. Case 4 illustrates the new reforming method in an operating mode where the reformer has about half the endothermic heat load of the reformer employed in Case 1. This flowsheet requires external energy use, albeit at a much lower temperature than the reformer operation for Case 1. In addition, it produces an intermediate ratio of 3.6 moles of $H_2$ per mole of fed $CH_4$. Case 5 is similar to Case 2, in that it employs a reformer that is slightly exothermic, requires external energy use, again at a much lower temperature than the reformer operation of Case 1, and produces exactly the stoichiometric ratio of 4 moles of $H_2$ per mole of fed $CH_4$. Its main difference from Case 2 is that it considers an amine-based $CO_2$ separator unit is selected as the $CO_2$ separation technology.

According to one aspect of the technology, a system for producing hydrogen from methane or other gaseous fuels is provided that has reduced heat requirements that can eliminate the need for a high temperature reformer furnace and the burning of fossil fuels to fuel the furnace.

Another aspect of the technology is to provide a system for producing hydrogen that can have the system heat demands satisfied with renewable sources such as solar towers or troughs or by non fossil fuels such as hydrogen and waste gases from the system.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only.

DETAILED DESCRIPTION

Referring more specifically to the drawings, for illustrative purposes, embodiments of the methods and resulting structures are generally shown. Several embodiments of the technology are described generally in FIG. 1 through FIG. 3 to illustrate the system, devices and methods. It will be appreciated that the methods may vary as to the specific steps and sequence and the system and devices may vary as to structural details without departing from the basic concepts as disclosed herein. The method steps are merely exemplary of the order that these steps may occur. The steps may occur in any order that is desired, such that it still performs the goals of the claimed technology.

The alternative reforming processes to conventional steam reformation schemes that are described have greatly reduced heat input requirements that can be provided without the combustion of fossil fuels. Input fuels such as methane are used as a source of hydrogen atoms rather than being burned for heat. Since the need for the ecternal 1200K hot utility is eliminated, it is possible to incorporate renewable energy resources to supply either all or part of the heat load of the system rather than use fossil fuels.

Implementation of this altered reforming mode requires that a CO source be available. The CO can be provided from an external source or created internally and cycled by the system. In one embodiment, this can be accomplished by taking advantage of the fact that the reverse water-gas shift reaction is also feasible at industrially realizable rates. In one embodiment, this is accomplished by introducing into the reformer feed significantly higher amounts of steam (water) and significant amounts of carbon monoxide (CO). This introduction substantially enhances the reaction rate of the water-gas shift reaction, which transforms CO and $H_2O$ to $CO_2$ and $H_2$. Since this reaction is exothermic, its enhancement alters the endothermic nature of the overall reforming process, possibly to the point where the overall reforming process is no longer endothermic, and may be lightly or even significantly exothermic.

Figure 1:
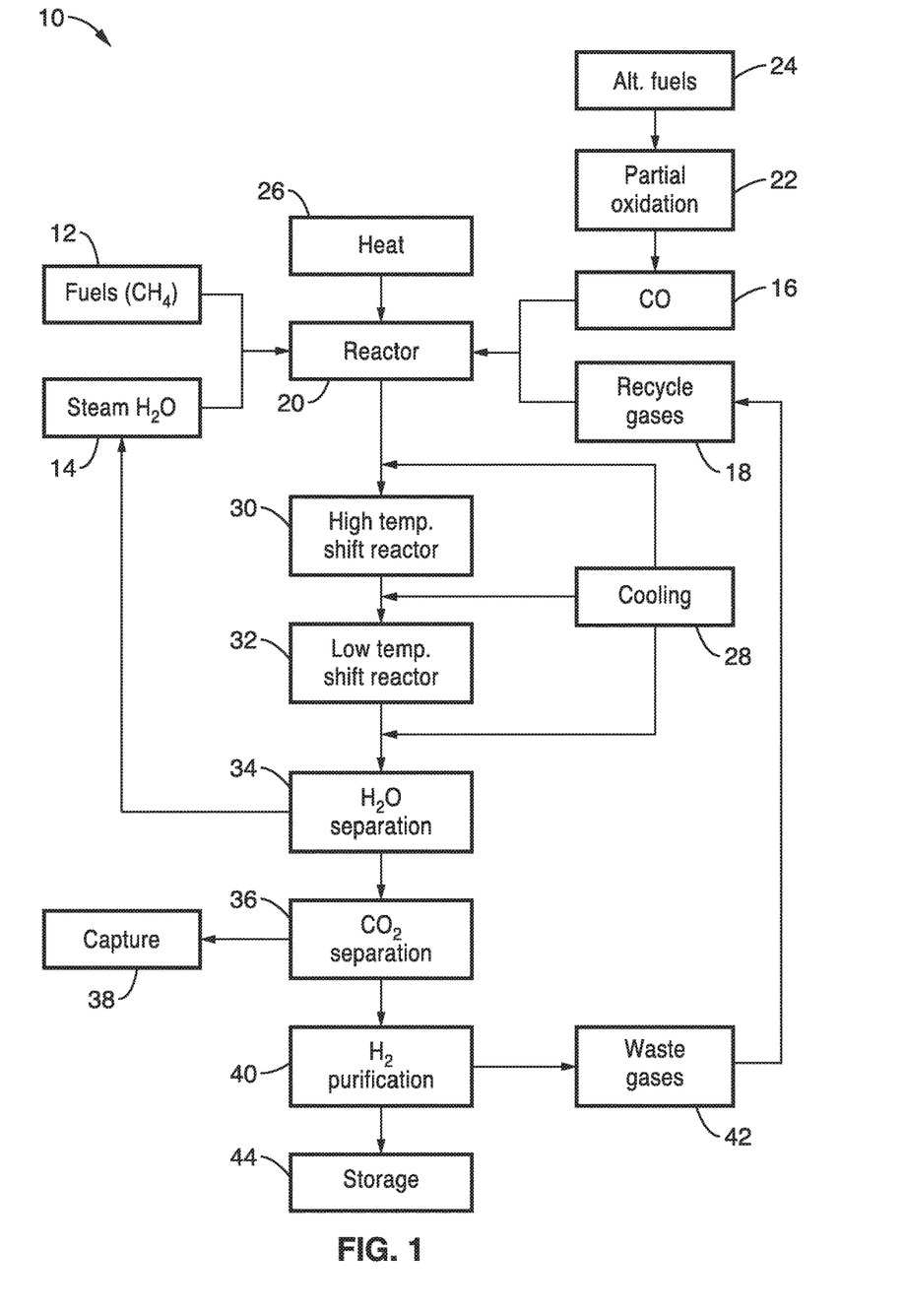
FIG. 1 is a schematic system diagram of an energetically enhanced system for hydrogen gas production including an outside carbon monoxide source according to one embodiment of the technology.

Turning now to FIG. 1, one embodiment 10 of a hydrogen production system according to the technology is generally shown to illustrate one suitable system structure. The system shown schematically in FIG. 1 has elements and subsystems of the conventional steam reformer and the system components are depicted generally for clarity. Features of the elements such as compressors, pumps, mixers valves and the like are incorporated in the designation of elements.

A collective feed of fuel 12, recycled steam or water 14, carbon monoxide 16 and optionally recycle gases 18 is introduced into a reactor 20 in this configuration. A preferred fuel 12 for this illustration is methane ($CH_4$). However, other suitable fuels can be used as a source of hydrogen. A stream of methane fuel 12 is compressed and heated and then mixed with the $H_2O$ stream 14 to form part of the feed to the reactor 20.

In the embodiment shown in FIG. 1, carbon monoxide 16 is provided initially from an outside source. The carbon monoxide requirements may eventually be supplied with recycled CO gases 18. One known method for producing carbon monoxide 16 is partial oxidation 22. Small-scale partial oxidation systems 22 can be adapted for varying loads, and can handle a variety of alternative fuels 24 to methane including ethane, ethanol, methanol, oil and gasoline. For example, methane or some other hydrocarbon feedstock is oxidized to produce carbon monoxide and hydrogen according to the equation:

$$CH_4 + \tfrac{1}{2}O_2 \rightarrow CO + 2H_2 \, \Delta h\degree = -36 \text{ MJ/kmol } CH_4$$

Since the reaction is exothermic, there is no requirement for an input of heat. Catalysts can enhance the yield of hydrogen per mole of methane, but are not required because of the high temperatures involved.

The reactor 20 and other elements in the system may also be heated with one or more heat sources 26. The heat load of the system is preferably produced without the combustion of fossil fuels and with renewable sources such as solar or hydrogen.

The reactant gases from the reactor 20 may be cooled by a cooling chiller 28 and fed into a high temperature shift (HTS) reactor 30. The reactor produces a mixture of $H_2$, CO, $CO_2$, $CH_4$ and $H_2O$.

The output of the high temperature shift reactor may be further cooled and then fed to a low temperature (LTS) reactor 32 in the embodiment shown in FIG. 1. The shift reactors covert carbon monoxide and water to carbon dioxide and hydrogen gas.

Thereafter, the output of the LTS reactor is cooled and then fed to a water separation subsystem 34 such as a flash separation unit (Flash Drum), to recycle the $H_2O$ back to the inlet 14 of the reactor 20.

The vapor outlet from the water separation subsystem 34 is then fed to an optional carbon dioxide separation subsystem 26 that can be used to separate carbon dioxide from the stream that is then captured 38 and removed.

A hydrogen gas ($H_2$) separation unit 40 can also be used to extract $H_2$ from the stream and the purified hydrogen gas is compressed and stored at block 44. The waste gases 42 from the $H_2$ purification scheme 40 will include residual methane $CH_4$, carbon monoxide, carbon dioxide and hydrogen gases. The waste gases 42 are preferably recycled back to the recycle gas input 18 of the reactor 20 and cycled back through the system.

One reduced energy configuration can be illustrated with a flowsheet with an overall external $CH_4$ feed 12 of 1 kmol/h, a reformer feed $H_2O/CO/CH_4$ ratio of 18/15/1, reformer operating temperature and pressure of 1150K and 5 bar respectively, resulting in the reactor 20 having an exothermic heat load of −2.6 kJ/s. Therefore, if the conventional endothermic heat load is eliminated altogether, then the furnace itself may be eliminated. In addition, if no hot utility is required at the conventional reformer's high operating temperatures, the system energy to carry out the overall reforming operations can be provided by renewable energy sources. For example, in configurations, where the temperature where external energy is needed (770K) is low enough to be provided by solar trough concentrators. Note, however, that the change of utility consumption from 1200K to 770K does not directly correlate to a change in reformer temperature from 1200K to 770K. Simply stated, no matter the utility temperature utilized, the reactor/reformer temperature always ranges from 1100K-1145K.

There are several important differences that exist between this flowsheet and the conventional baseline flowsheet. For example, the baseline flowsheet produces a $CO_2/N_2$ gas mixture, while the illustrated flowsheet produces pure $CO_2$. In addition, the illustrated flowsheet has much larger recycling flows than the baseline flowsheet. Another important difference is that the baseline flowsheet produces 2.58 kmol/h $H_2$, while the illustrated flowsheet produces 4 kmol/h $H_2$.

Aside from this flowsheet, many other flowsheets with an intermediate endothermic/exothermic effect can be developed. Thus, if one is willing to continue having a reformer furnace, any level of endothermicity between 42.36 kJ/s endothermic and −2.6 kJ/s exothermic can be attained. As endothermicity decreases, the recycling flows increase.

Figure 2:
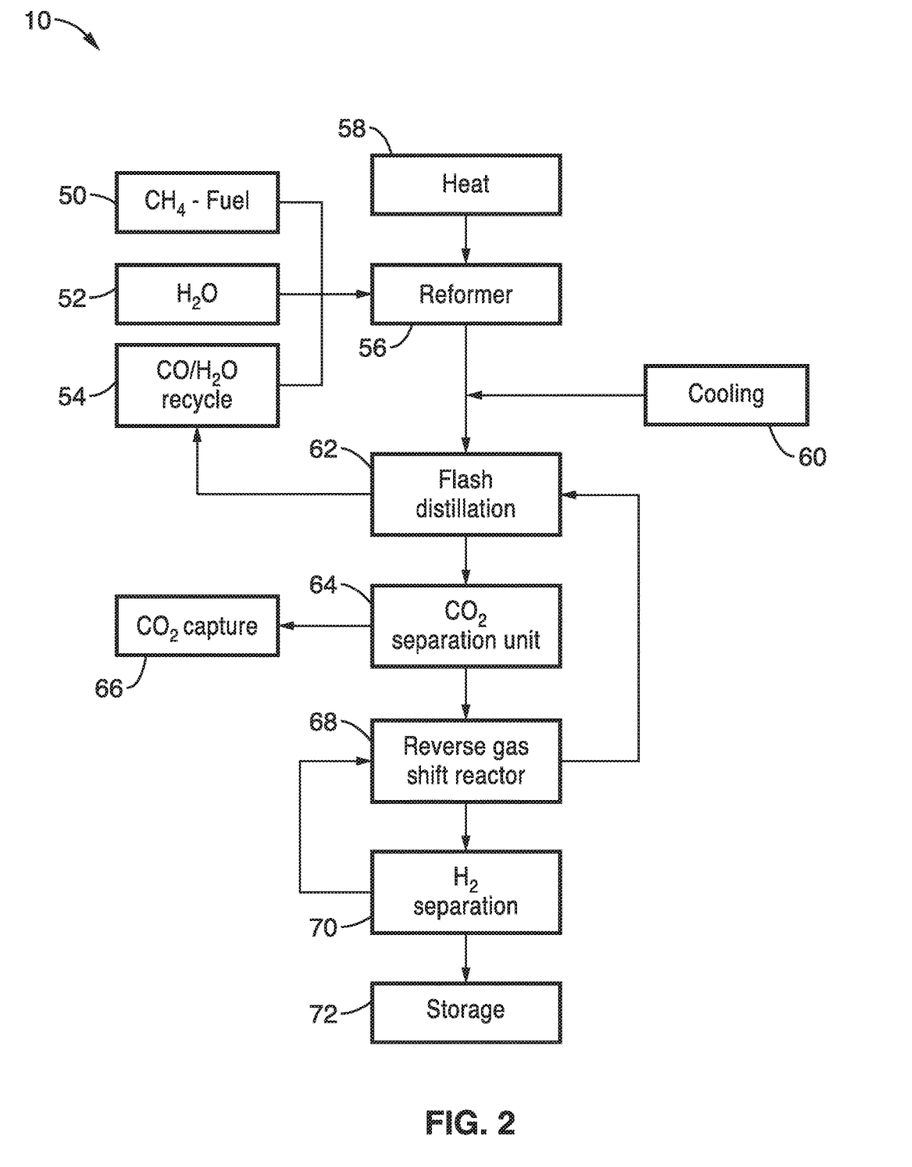
FIG. 2 is a schematic system diagram of an energetically enhanced system for hydrogen gas production that is self contained using recycled carbon monoxide, waste gases and water according to an alternative embodiment of the technology.

Referring now to FIG. 2, an alternative embodiment of the system where the carbon monoxide feed is created internally and no external source is provided. In the configuration of FIG. 2, the reformer subsystem 56 is fed by a fuel feed 50, a water/steam feed 52 and a CO recycle feed 54. In one embodiment, the water needs of the system are provided by recycling of water internally and water feed 52 from an outside source is not necessary.

The reformer 56 and the other system elements requiring heat receive the necessary thermal requirements from a heating subsystem 58. The cooling requirements of the system are provided by a cooling subsystem 60.

The reformer 56 output flow is connected to a flash distillation water separator 62 that separates out the water from the flow and recycles it to the input feed 54. The return of separated water can be to water input 52 or accompanied with carbon monoxide to the recycle input feed 54.

The output flow from the flash distiller 62 is sent to a carbon dioxide separation unit 64 for removal of excess carbon dioxide that is then captured by a capture system 66. Captured excess carbon dioxide can be removed from the system. The remaining flow of gases from the $CO_2$ separation unit 64 are directed to a hydrogen separator subsystem 70 and the residual carbon dioxide is directed to a reverse gas shift reactor 68. The carbon monoxide that is produced by the conversion of $CO_2$ to CO in the reverse gas shift reactor can be controlled and the desired quantities recycled back to the $CO/H_2O$ feed 54 and to the reformer 56 in this embodiment. The final hydrogen is then stored in storage 72.

A comparable overall flowsheet with inlets of 1 kmol/h $CH_4$ and 2 kmol/h $H_2O$, and outlets of 4 kmol/h $H_2$ and 1 kmol/h $CO_2$ is used to illustrate the process. This flowsheet is shown as Case 2 in Table 1. Following water 52 pumping and $CH_4$ fuel 50 compression to 5 bar, both streams are heated to 1140K, are mixed with a $CO/H_2O$ recycle stream also heated to 1140K, and are then fed to the reformer (MSR) 56, creating a reformer feed with 18/15/1 $H_2O/CO/CH_4$ ratio. The reformer 56 operating temperature and pressure are 1140K and 5 bar respectively. The MSR reformer 56 has an exothermic heat load of −0.8529 kJ/s at 1140K.

The reformer product stream VMSR is cooled to 750K and mixed with the recycle stream which is also at 750K. The resultant mixture stream is further cooled to 313K, and then fed to an adiabatic flash distillation vessel V-100 62 operating at 5 bar and 313 K that separates most of the liquid water, which is then used to form the reformer recycle stream. The flash vapor product is fed to a $CO_2$ capture unit 64. The $CO_2$ outlet of the $CO_2$ capture unit 64 is then split, at a ratio of 4.8/95.2, into the pure $CO_2$ outlet product of the overall flowsheet, and a $CO_2$ stream fed to the reverse gas-shift reactor (RGS) 68.

The $CO_2$-lean product emanating from the $CO_2$ capture unit 64 is then fed into a $H_2$ separation process 70 which separates the $H_2$ gas, and recycles the remaining gases to the reformer feed stream. The pure $H_2$ exit of the $H_2$ separation process is then split, at a ratio of 15/85, into the pure $H_2$ outlet product of the overall flowsheet and stored 72, and an $H_2$ stream fed to the reverse gas-shift reactor (RGS) 68. The resulting $CO_2/H_2$ mixture is then heated to 750K and fed to the reverse gas-shift reactor (RGS) 68. The RGS reactor 68 has an endothermic heat load need of 62.46 kJ/s at 750K. The RGS exit stream is recycled to the inlet of the aforementioned adiabatic flash 62. Pinch analysis-based heat integration is carried out (with a $\Delta T_{min}$ of 4K) making available three hot utilities at 1200K, 770K, and 420K, and one cold utility at 298K.

The minimum utility cost solution reveals that no 1200K hot utility is needed (eliminating the need for a reformer furnace), 62.6441 kJ/s of 770K hot utility is needed (62.40 kJ/s of which is used to meet the RGS endothermic heat load, and the remainder ensures that the hot composite curve of the flowsheet is above the cold composite curve in pinch analysis), 18.4920 kJ/s of 420K hot utility is needed, and 2.9870 kJ/s of 298K cold utility is needed.

Although no reformer furnace is needed in this illustration, this heat load did not disappear. In fact a larger endothermic heat load need of 62.40 kJ/s has appeared in a gas shift reactor (GBR-$CO_2$) that forms CO from $CO_2$, thus operating reversely from the commonly used shift reactors which make $CO_2$ from CO and are exothermic. However this endothermic need now occurs at 750 K, rather than the higher temperatures.

In another embodiment, an amine-based $CO_2$ separator unit 64 is selected as the $CO_2$ separation technology. This flowsheet is shown as Case 5 in Table 1. Since the amine-based $CO_2$ separator unit employs its own reboiler and condenser, additional hot and cold utility loads must be employed. Indeed, the minimum utility cost solution reveals that no 1200K hot utility is needed while 62.5686 kJ/s of 770K hot utility and 1157.5990 kJ/s of 420K hot utility is needed and 633.5785 kJ/s of 298K cold utility is needed.

Figure 3:
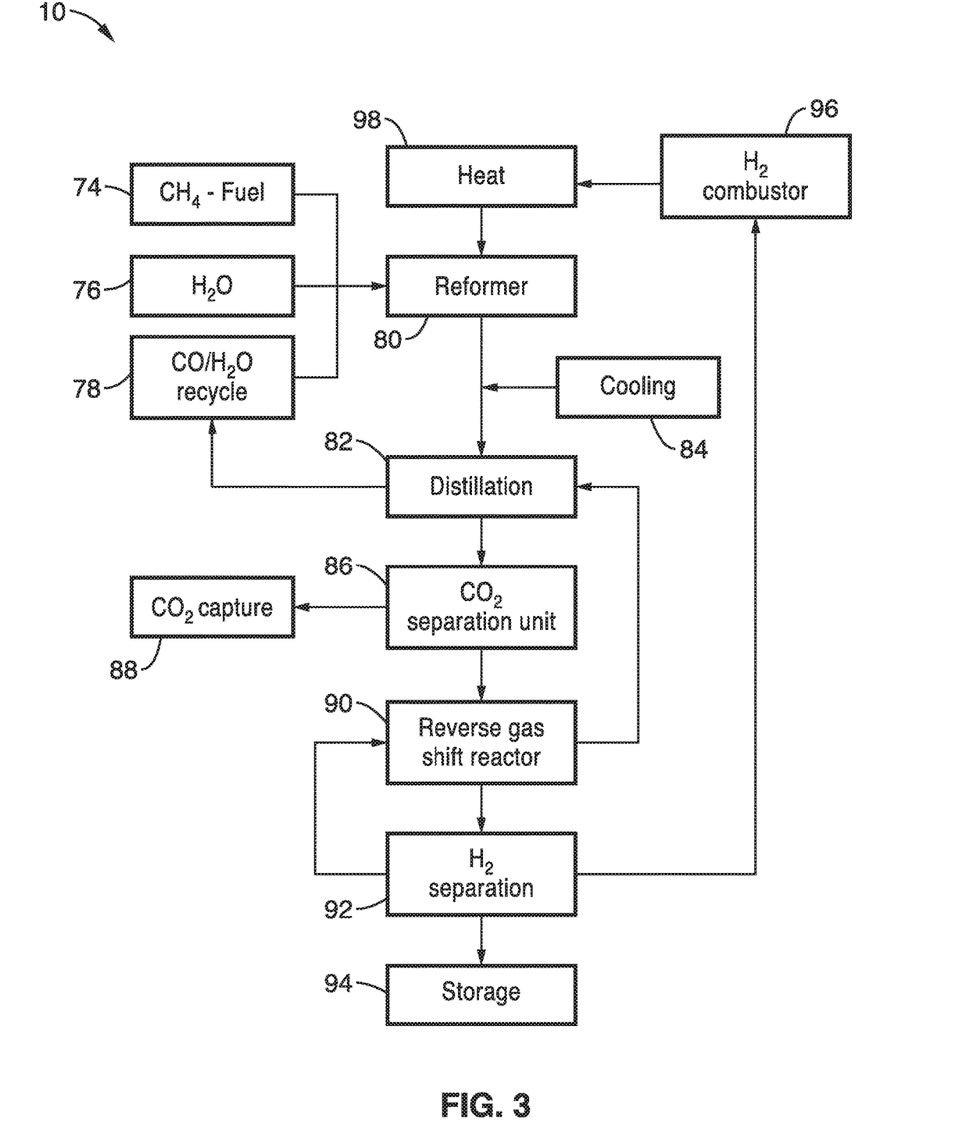
FIG. 3 is a schematic system diagram of an energetically enhanced system for hydrogen gas production that is self contained using system generated heat and recycled carbon monoxide, waste gases and water according to an alternative embodiment of the technology.

Similarly, the embodiment shown in FIG. 3 illustrates the reforming method in an operating mode where the reformer is slightly exothermic. This flowsheet is shown as Case 3 in Table 1. However, this flowsheet requires no external energy use, but it produces only 3.1 moles of $H_2$ per mole of fed $CH_4$. In the configuration of FIG. 3, the input feed of fuel 74, water 76 and recycled water and carbon dioxide 78 provide control over the reaction conditions in the reformer subsystem 80. The reaction products from the reformer 80 are directed to a distiller 82 to remove and recycle water to the recycle input 78. Cooling for any element of the system is provided by a cooling subsystem 84.

Carbon dioxide is separated with a $CO_2$ separation unit 86 and either sent to a reverse gas shift reactor 90 and converted to carbon monoxide or captured 88 and removed. The produced carbon monoxide is preferably recycled to the recycle input 78.

The hydrogen gas in the flow is preferably purified with an $H_2$ separator 92 and stored in storage 94. The residual waste gases and purge gases from the hydrogen separator 92 along with a portion of the hydrogen gas that is produced are sent to a combustor 96 for providing the necessary thermal requirements by the various processes by the heat subsystem 98. In this embodiment, no fossil fuels are burned directly and the system is self sufficient.

The configuration shown in FIG. 3 is similar to that shown in FIG. 2, except that part of the $H_2$ stream is now burned with air in a combustor 96 operating at 1200K. The overall flowsheet (Case 3) inlets are 1 kmol/h $CH_4$ and 1.1 kmol/h $H_2O$, and the overall flowsheet outlets are 3.1 kmol/h $H_2$ and 1 kmol/h $CO_2$ in this illustration. The heat load generated in the combustor (61.7 kJ/s) is such that the endothermic needs of the process are met, so that heat integration analysis indicates that there is no need for hot utility use at 1200K. The combustor 96 outlet is then cooled and preferably processed through a flash separator to remove liquid $H_2O$. The flash vapor outlet is a nitrogen-rich stream which is released to the environment. The flash liquid $H_2O$ outlet is then heated first to 740K and then to 1140K and finally recycled to the reformer 80.

Pinch analysis-based heat integration is carried out (with a $\Delta T_{min}$ of 4K) making available three hot utilities at 1200K, 770K, and 420K, and one cold utility at 298K. The minimum utility cost solution reveals that no 1200K hot utility is needed (eliminating the need for a reformer furnace), no 770K hot utility is needed, 0.9023 kJ/s 420K hot utility is needed, and 3.7294 kJ/s of 298K cold utility is needed.

In another configuration, the reformer is now endothermic with a heat load of 24.04 kJ/s and this load is matched by the output of the combustor which produces 26.38 kJ/s in an exothermic heat load. The minimum utility cost solution reveals that no 1200K or 420K hot utility is needed while 114.5898 kJ/s of 770K hot utility is needed (36.25 kJ/s of which is used to meet the RGS endothermic heat load and 66.2738 kJ/s of 298K cold utility is needed. In this case, the overall flowsheet inlets are 1 kmol/h $CH_4$ and 1.6 kmol/h $H_2O$, and the overall flowsheet outlets are 3.6 kmol/h $H_2$ and 1 kmol/h $CO_2$. This flowsheet is shown as Case 4 in Table 1.

For all designs, a heat integration analysis is performed to determine the minimum hot/cold utility energy consumption. Table 1 provides a summary comparison of the prior art baseline design (Case 1) with the process and alternative designs (Cases 2 to 5) described in relation to FIG. 2 and FIG. 3.

For example, the baseline design (Case 1) uses no external hot utilities (at 1200K, 770K, 420K) and produces 2.6 kmol/hr of $H_2$ for a feed of 1 kmol/hr of $CH_4$. It employs a furnace (combustor) to provide the reformer's endothermic load of 42.61 kJ/s. By comparison, the flowsheet for Case 2 utilizes 62.6441 kJ/s of the 770K hot utility and generates 4 kmol/hr of $H_2$ for the same feed of 1 kmol/hr of $CH_4$. Since the heat of combustion of $H_2$ is 288000 kJ/kmol of $H_2$, this suggests that the combustion of 0.93 kmol $H_2$/hr can meet the utility need of the Case 2 flowsheet. In turn this implies that the Case 2 flowsheet can be energetically equivalent to the baseline Case 1 flowsheet, and produce 3.07 kmol $H_2$/hr compared to 2.6 kmol $H_2$/hr for the Case 1 flowsheet. This represents an 18% higher $H_2$ production for the same $CH_4$ inlet, and no external energy consumption.

In addition, Case 2 has the added advantage that it generates $CO_2$ as a pure product that is ready for carbon sequestration or for any other use. The energetic features of Case 2 can be even further improved, if renewable energy resources are available at 770K and 420K. Solar trough concentrators and geothermal wells can deliver energy at these temperature levels. Another advantage of the Case 2 flowsheet is that it requires no high energy (1200K) furnace, thus significantly reducing the capital cost of the overall reforming process. The flowsheets for Case 3 and Case 4 flowsheets have similarly favorable energetic characteristics compared to the baseline design of Case 1.

Accordingly, the technology described herein presents systems and methods that change the extent of endothermicity of the conventional steam reforming processes. Further, from the description provided herein, a person having ordinary skill in the art would readily arrive at numerous alternative designs utilizing the outlined methods. These designs can incorporate, for example, one or several of the following modifications:

(a) The reformer MSR does not operate exothermically, but operates with lesser endothermic heat load with respect to the baseline design.

(b) Incorporation of multiple pressure swing adsorbers in series, parallel, or in a general subnetwork.

(c) Incorporation of multiple flash separators in series, parallel, or in a general subnetwork.

(d) Incorporation of multiple amine separators in series, parallel, or in a general subnetwork.

(e) Incorporation of other separation technologies in the process.

(f) Incorporation of other reactor technologies in the process.

(g) Use of entrainers to enhance separation of mixtures throughout the process.

(h) Use of several sources of hot utility and cold utility in the process to deliver and expel heat to and from the network (high vs. low temperature, fossil-fuel vs. renewable, etc.).

(i) Varying operating conditions (temperatures, pressures, flow configuration) of the various process units employed.

(j) Preheating/precooling of inlet flows to the reformer MSR, GBR-$CO_2$ Reactor, and GBR-CO Reactor.

(k) Incorporation of a subnetwork that treats the outlet $CO_2$ stream from the proposed steam reforming process, so as to prevent $CO_2$ emissions.

(l) Varying overall network inlet and outlet flowrates (e.g. $CH_4$ in, $H_2O$ in, AIR in, flue gas out, $CO_2$ out, $H_2$ out, etc.).

(m) Varying splitting ratios for any splitting portion in any design.

(n) Varying heat/power integration networks of heat exchangers, heat engines, heat pumps, so as to improve overall process economics, in order to minimize heat load on available hot and cold utilities.

The invention may be better understood with reference to the accompanying examples, which are intended for purposes of illustration only and should not be construed as in any sense limiting the scope of the present invention as defined in the claims appended hereto.

Example 1

In order to prove the concept of the system and methods, a process intensified hydrogen framework was developed and compared with the traditional natural gas based steam reforming hydrogen production process. The evaluated system demonstrated a reduced heat load and overall cost with the elimination of 1200 K external hot utility element.

The tested frameworks utilized equilibrium reactors, modeled through a Gibbs free energy minimization approach, which left each reactor's feed completely undefined in terms of species molar composition, imposing only a two dimensional restriction on the feed's atom molar ratios (H/C, O/C). In turn this allowed the identification of CO-rich reformer feeds that make the reformer exothermic (with 97% methane conversion), that can be constructed from the streams being made available from the reactor/separator universe ($H_2O$ separators, $H_2$ separators, $CO_2$ separators, high/low temperature shift reactors, and reverse gas shift reactors) considered in the tested flowsheet representations.

A baseline flowsheet of a conventional natural gas reforming based system for hydrogen production was first created on the UniSim (Honeywell Inc. trademark) software. The Peng Robinson equation of state was used to capture the thermodynamic properties of the gas mixture. Natural gas (1 kmol/hr) and water (2 kmol/hr) enter the flowsheet at 298K. Subsequently, both are compressed to 5 bar through the use of a compressor and a pump. Prior to entering a reformer with outlet temperature 1100K, the water and carbon dioxide undergo heating. The reformer outlet is subsequently fed into a sequence of high temperature shift (650K outlet temperature), low temperature shift (475K outlet temperature) reactors with cooling in between. The resultant stream is then cooled before undergoing water, carbon dioxide and hydrogen separation all at 313K. The water, unreacted methane, and carbon monoxide are recycled to the reformer, while hydrogen (4 kmol/hr) and carbon dioxide (1 kmol/hr) are the flowsheet products. External hot utility loads of 216.8 kJ/mol of $CH_4$ fed, 21.78 kJ/mol of $CH_4$ fed, and 11.84 kJ/mol $CH_4$ fed are needed at 1200K, 770K and 420K respectively.

Several design variations of the technology were prepared and compared to the baseline flowsheet of the conventional reformer. The overall stoichiometry of the baseline flowsheet (1 kmol/hr of $CH_4$ in, 2 kmol/hr $H_2O$ in, $4H_2$ kmol/hr out and 2 $CO_2$ kmol/hr out) was imposed on the designs. Multiple optimization instances were carried out for varying cost coefficient ratios of the three hot utilities. In particular, cost coefficient ratios of 24:2:1($Q_{HU_1}$:$Q_{HU_2}$:$Q_{HU_3}$), 4:2:1, 3:2:1, and 2.5:2:1 were considered.

When the cost coefficient of the 1200K (HU1) utility is double the cost coefficient of the 770K utility (HU2), the formulated flowsheet uses no 1200K utility. The amount of utility consumed in these flowsheets is summarized in Table 2.

In the tested flowsheet, the reformer had a load of −5 kJ/mol of $CH_4$ fed which had a cost coefficient ratio of 4:2:1. In addition, external hot utility loads of 248 kJ/mol of $CH_4$ and 32.01 kJ/mol of $CH_4$ are needed at 770K and 420K respectively. The flowsheet produced pure $CO_2$ as a process by-product as well as 4 moles of pure $H_2$ per mole of fed $CH_4$ fuel.

Removing the need for a 1200K external hot utility allows the energy needs in the tested flowsheet to be potentially met through use of renewable energy sources, such as solar concentrated power. As the cost coefficient ratio between the 1200K and 770K utility varies from 2.5:2 to 24:2, the amount of 1200K utility used by the tested flowsheet will decrease from 26.26 kJ/s (for 2.5:2 ratio) to 0 kJ/s (for 4:2 ratios and above). These results are summarized in Table 3.

Lowering the hot utility ratio from 4:2:1 to 1.2:1:1 produced several possible flowsheets. For example, one flowsheet was obtained utilizing the cost coefficient of 2.5:2:1. Another flowsheet was obtained by utilizing a cost coefficient ratio of 1.2:1:1, and utility upper bounds of 50 kJ/s (1200 K), and 15 kJ/s (770 K). One flowsheet that was evaluated employed a reverse-gas-shift (RGS) reactor, a high-temperature swing reactor (HTS), a low-temperature swing reactor (LTS) and three reformers operating at 1145K, 1145K, and 1100K respectively. Another flowsheet that was evaluated employed a reverse-gas-shift (RGS) reactor, and a steam-methane reformer operating at 1050K. Both flowsheets have 1 mol of CH4 and 2 moles of $H_2O$ as inputs and 1 mol of $CO_2$ and 4 moles of $H_2$ as outlets.

At small coefficient ratios, generated flowsheets used a combination of 1200K and 770K utilities to reduce the total external hot utility cost. At coefficient ratios of 4:2 and above, no 1200K utilities are employed in the tested flowsheets. The impact on the utility cost is significant. At coefficient ratio 4:2, the tested design utility cost is $0.62, while the baseline design is $1.10. At coefficient ratio 24:2 the total utility cost difference between the two designs is pronounced ($6.22 to $0.62).

For large cost coefficient ratios of the hottest (1200K) available utility to the second hottest (770K) available utility, optimal flowsheets were identified that do not require a heat source at 1200K, but rather only at 770K. This comes at the expense of increased separation costs, since the flowsheet synthesis method is carried out without commitment to any particular separation technology. Nevertheless, it should be noted that pressure swing adsorption can be employed to separate high CO content hydrogen mixtures, thus avoiding the need for cryogenic separation methods.

Reducing or even removing the 1200K utility bad also reduces or removes the need for burning natural gas or other fossil fuels to power the reformer, and introduces the possibility of using renewable energy sources, while the natural gas is only used as raw material, and not as an energy source. Utilizing a lower temperature hot utility to carry out the reforming process, opens the path to the use of renewable energy for natural gas reforming based hydrogen production, thus increasing the efficiency of the production process. The HHV of natural gas is 52.2 MJ/kg, and with a density of 22 kg/Mcf, the HHV of natural gas is 1148.4 MJ/Mcf. If the average price of natural gas is $12.23/Mcf, the cost coefficient of natural gas used as an energy source (hot utility) is $1.065*10$^{-5}$/kJ (i.e. $0.038/kVVh).

A potential renewable energy resource that can be brought to bear as a hot utility for the natural gas reforming process is concentrated solar power (CSP). Its additional advantage is that access to the sun's energy is free. Solar concentration takes place typically in solar trough and solar tower configurations. A variety of working fluids can be used, including molten salts and synthetic oils. Solar towers can currently deliver temperatures of 835K, and solar troughs can currently deliver 720K. It is apparent that second highest temperature (770 K) and third highest temperature (420 K) hot utilities can be delivered by concentrated solar power (CSP) tower and trough plants.

From the description herein, it will be appreciated that that the present disclosure encompasses multiple embodiments which include, but are not limited to, the following:

1. An energy efficient method for the production of hydrogen gas, the method comprising: (a) flowing a $H_2O$/CO/$CH_4$ feed into a reactor; (b) reforming the feed gases to produce a stream of $H_2$, $CO_2$ and residual $H_2O$, CO and $CH_4$ feed gases; (c) separating $H_2O$ from the stream and recycling separated water to the reactor; (d) separating $CO_2$ from the stream; (e) purifying $H_2$ from the stream; and (f) recycling remaining gases from the $H_2$ separation to the reactor.

2. The method of any preceding embodiment, further comprising:
converting $CO_2$ from the stream to CO; and recycling the CO to the reactor feed.

3. The method of any preceding embodiment, further comprising:
combusting hydrogen gas from an output stream of purified hydrogen gas to provide system heat requirements.

4. The method of any preceding embodiment, wherein the reactor feed ratio of $H_2O$/CO/$CH_4$ is 18/15/1.

5. The method of any preceding embodiment, wherein the reactor operating temperature and pressure are 1140K and 5 bar respectively.

6. The method of any preceding embodiment, wherein the heat requirements of the system are a (770K) utility and a (420 K) utility.

7. The method of any preceding embodiment, wherein the carbon monoxide feed is produced by partial oxidation of a hydrocarbon fuel selected from the group of fuels consisting of methane, ethane, ethanol, methanol and gasoline.

8. The method of any preceding embodiment, further comprising:
converting $CO_2$ from the stream to CO; and cycling the converted CO with the CO produced by partial oxidation to the reactor feed.

9. A system for producing hydrogen from a hydrocarbon fuel, the system comprising: (a) one or more reactors with an output stream; (b) an input feed subsystem of controlled temperatures, pressures and concentrations of fuel, water, and carbon monoxide coupled to the reactor; (c) a water removal subsystem configured to remove water from the output stream of the reactor recycle water to the input feed; (d) a carbon dioxide separation subsystem configured to remove carbon dioxide from the output stream of the reactor; and (e) a hydrogen purification subsystem configured to remove hydrogen from the output stream of the reactor and recycling residual gases to the input feed subsystem.

10. The system of any preceding embodiment, further comprising: a system heat source configured to provide heat to the reactor and subsystems.

11. The system of any preceding embodiment, wherein the system heat source comprises a combustor capable of burning hydrogen and waste gases produced by the hydrogen purification system.

12. The system of any preceding embodiment, wherein the system heat source comprises a solar tower producing temperatures of between 720 K and 835 K.

13. The system of any preceding embodiment, wherein the carbon dioxide separation subsystem further comprises: a reverse gas shift reactor for converting carbon dioxide to carbon monoxide; wherein carbon monoxide is recycled back to the input feed subsystem.

14. The system of any preceding embodiment, wherein the carbon dioxide separation subsystem further comprises: an amine carbon dioxide separator; and a reverse gas shift reactor for converting carbon dioxide to carbon monoxide; wherein carbon monoxide is recycled back to the input feed subsystem; and wherein excess system carbon dioxide is captured.

15. A system for producing hydrogen from a hydrocarbon fuel, the system comprising: (a) one or more reactors with an output stream; (b) an input feed subsystem of controlled temperatures, pressures and concentrations of fuel, water, carbon monoxide and recycle gases coupled to each reactor; (c) a shift reactor subsystem configured to convert carbon monoxide to carbon dioxide from the output stream of the reactor; (d) a water removal subsystem configured to remove water from the output stream of the reactor recycle water to the input feed; (e) a carbon dioxide separation subsystem configured to remove carbon dioxide from the output stream of the reactor; and (f) a hydrogen purification subsystem configured to remove hydrogen from the output stream of the reactor and recycling residual gases to the input feed subsystem.

16. The system of any preceding embodiment, further comprising: a partial oxidation reactor connected to the input feed producing carbon monoxide and hydrogen from a hydrocarbon fuel.

17. The system of any preceding embodiment, wherein the shift reactor comprises a high temperature shift reactor and a low temperature shift reactor.

18. The system of any preceding embodiment, wherein the carbon dioxide separation subsystem further comprises: a reverse gas shift reactor for converting carbon dioxide to carbon monoxide; wherein carbon monoxide is recycled back to the input feed subsystem.

19. The system of any preceding embodiment, wherein the carbon dioxide separation subsystem further comprises: an amine carbon dioxide separator; wherein carbon monoxide is recycled back to the input feed subsystem; and wherein excess system carbon dioxide is captured.

20. The system of any preceding embodiment, further comprising: a system heat source configured to provide heat to the reactor and subsystems comprising a solar tower producing temperatures of between 720 K and 835 K.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for."

TABLE 1

Case Comparisons

| Metric | Case 1 (prior art baseline, 2.6 $H_2$ out) | Case 2 (exo reformer 4.0 $H_2$ out) | Case 3 (exo reformer 3.1 $H_2$ out) | Case 4 (endo reformer 3.6 $H_2$ out) | Case 5 (Case 2 amine $CO_2$ separation) |
|---|---|---|---|---|---|
| Overall $CH_4$ inlet (kmol/h) | 1 | 1 | 1 | 1 | 1 |
| Overall $H_2O$ inlet (kmol/h) | 0.9 | 2 | 1.1 | 1.6 | 2 |
| Overall AIR inlet (kmol/h) | 3.6 | 0 | 3.4 | 1 | 0 |
| Overall $H_2$ outlet (kmol/h) | 2.6 | 4 | 3.1 | 3.6 | 4 |
| Overall $CO_2$ outlet (kmol/h) | 1 | 1 | 1 | 1 | 1 |
| HU (1200 K) energy consumption (kJ/s) | 0 | 0 | 0 | 0 | 0 |
| HU (770 K) energy consumption (kJ/s) | 0 | 62.6441 | 0 | 114.5898 | 62.5686 |
| HU (420 K) energy consumption (kJ/s) | 0 | 18.4920 | 0.9023 | 0 | 1157.5990 |
| CU (298 K) energy consumption (kJ/s) | 40.2022 | 2.9870 | 3.7294 | 66.2738 | 633.5785 |
| mol $CH_4$ fed to reformer | 1 | 1.025 | 1.025 | 1.006 | 1.025 |
| mol CO fed to reformer (kgmol/h) | 0 | 14.64 | 14.64 | 6.612 | 14.64 |
| mol $H_2O$ fed to reformer | 2.8978 | 17.70 | 17.70 | 17.46 | 17.70 |
| mol $CO_2$ fed to reformer | 0.0022 | 0.2168 | 0.2168 | 0.3025 | 0.2168 |
| mol $H_2$ fed to reformer | 0 | 0.2722 | 0.2722 | 0.3561 | 0.2722 |
| mol $CH_4$ from reformer | 0.2776 | 0.0264 | 0.0264 | 0.005657 | 0.0264 |

TABLE 1-continued

| | Case Comparisons | | | | |
|---|---|---|---|---|---|
| Metric | Case 1 (prior art baseline, 2.6 $H_2$ out) | Case 2 (exo reformer 4.0 $H_2$ out) | Case 3 (exo reformer 3.1 $H_2$ out) | Case 4 (endo reformer 3.6 $H_2$ out) | Case 5 (Case 2 amine $CO_2$ separation) |
| mol CO from reformer (kgmol/h) | 4.1361 | 8.695 | 8.695 | 3.331 | 8.695 |
| mol $H_2O$ from reformer | 1.8667 | 9.755 | 9.755 | 12.18 | 9.755 |
| mol $CO_2$ from reformer | 0.3110 | 7.166 | 7.166 | 4.584 | 7.166 |
| mol $H_2$ from reformer | 2.4761 | 10.22 | 10.22 | 7.637 | 10.22 |
| Reformer heat load (kJ/s) | 42.56 | −0.8529 | −0.8501 | 24.04 | −0.8529 |
| Reformer heat load per mol $CH_4$ fed to reformer | 42.56 | −0.8321 | −0.8104 | 23.90 | −0.8321 |
| mol $CH_4$ fed to GBR-$CO_2$ reactor (kgmol/h) | n/a | 0 | 0 | 0 | 0 |
| mol CO fed to GBR-$CO_2$ reactor (kgmol/h) | n/a | 0.1406 | 0.1406 | 0.06456 | 0.1406 |
| mol $H_2O$ fed to GBR-$CO_2$ reactor (kgmol/h) | n/a | 0 | 0 | 0 | 0 |
| mol $CO_2$ fed to GBR-$CO_2$ reactor (kgmol/h) | n/a | 19.66 | 19.66 | 27.82 | 19.66 |
| mol $H_2$ fed to GBR-$CO_2$ reactor (kgmol/h) | n/a | 22.95 | 22.95 | 31.08 | 22.95 |
| mol $CH_4$ from GBR-$CO_2$ reactor (kgmol/h) | n/a | 0 | 0 | 0 | 0 |
| mol CO from GBR-$CO_2$ reactor (kgmol/h) | n/a | 6.079 | 6.079 | 3.356 | 6.079 |
| mol $H_2O$ from GBR-CO2 reactor (kgmol/h) | n/a | 5.938 | 5.938 | 3.292 | 5.938 |
| mol $CO_2$ from GBR-$CO_2$ reactor (kgmol/h) | n/a | 13.72 | 13.72 | 24.53 | 13.72 |
| mol $H_2$ from GBR-$CO_2$ reactor (kgmol/h) | n/a | 17.01 | 17.01 | 27.78 | 17.01 |
| GBR $CO_2$ Reactor heat load (kJ/s) | n/a | 62.46 | 62.46 | 36.25 | 62.46 |
| Combustor heat load | −81.41 | n/a | −61.70 | −26.38 | n/a |
| Total work of compression (kJ/s) | 3.489 | 1.770 | 8.128 | 3.640 | 1.770 |
| Total work of pumping (kJ/s) | 0.0231 | 0.005298 | 0.002898 | 0.004239 | 0.005298 |
| mol of $CO_2$ captured in Amine system(kmol/hr) | n/a | 20.65 | 20.65 | 20.84 | 20.65 |
| Work for $H_2$ separation (kJ/s) (minimum) | −2.211583 | 17.565 | 17.565 | 12.047 | 17.565 |
| Amine reboiler heat load (kJ/s), [3] | n/a | 0 | 0 | 0 | 1142 |
| Amine system condenser heat load (kJ/s) [3] | n/a | 0 | 0 | 0 | −633 |
| Work for CO2 separation (kJ/s) | n/a | 25.477 | 25.477 | 29.829 | 25.477 |

TABLE 2

Amount of Utility Consumed with Cost Coefficient Ratio of 4:2:1

| Metric | HU1(1200 K) | HU2(770 K) | HU3(420 K) |
|---|---|---|---|
| Cost Coefficient ($/(kJ/s)) | 0.017 | 0.0085 | 0.00425 |
| Baseline Utility Consumption (kJ/s) | 60.5 | 6.26 | 3.11 |
| (4:2:1) Utility Consumption (kJ/s): | 0 | 68.97 | 8.9 |

TABLE 3

Summary Table of Natural Gas Based Hydrogen Production

| Metric | Baseline | 24:2:1 | 4:2:1 | 3:2:1 | 2.5:2:1 |
|---|---|---|---|---|---|
| Total Hot Utility Cost (24:2:1) | 6.22 | 0.62 | | | |
| Total Hot Utility Cost (4:2:1) | 1.10 | | 0.62 | | |
| Total Hot Utility Cost (3:2:1) | 0.83 | | | 0.64 | |
| Total Hot Utility Cost (2.5:2:1) | 0.71 | | | | 0.69 |
| HU at 1200 K, (kJ/s) | 60.3 | 0 | 0 | 3.37 | 26.26 |
| HU at 770 K, (kJ/s) | 6.06 | 68.97 | 68.97 | 66.6 | 46.73 |
| HU at 420 K, (kJ/s) | 3.29 | 8.9 | 8.9 | 7.64 | 5.14 |

What is claimed is:

1. An energy efficient method for the production of hydrogen gas, the method comprising:
   (a) flowing a $H_2O/CO/CH_4$ feed with a feed ratio of $H_2O/CO/CH_4$ of 18/15/1 into a reactor;
   (b) reforming the feed gases to produce a stream of $H_2$, $CO_2$ and residual $H_2O$, CO and $CH_4$ feed gases;
   (c) separating $H_2O$ from the stream and recycling separated water to the reactor;
   (d) separating $CO_2$ from the stream;
   (e) purifying $H_2$ from the stream; and
   (f) recycling remaining gases from the $H_2$ separation to the reactor.

2. The method of claim 1, further comprising:
   converting $CO_2$ from the stream to CO; and
   recycling the CO to the reactor feed.

3. The method of claim 1, further comprising:
   combusting hydrogen gas from an output stream of purified hydrogen gas to provide system heat requirements.

4. The method of claim 1, wherein the reactor operating temperature and pressure are 1140K and 5 bar respectively.

5. The method of claim 1, wherein the heat requirements of the system are a (770K) utility and a (420 K) utility.

6. The method of claim 1, wherein the carbon monoxide feed is produced by partial oxidation of a hydrocarbon fuel selected from the group of fuels consisting of methane, ethane, ethanol, methanol and gasoline.

7. The method of claim 6, further comprising:
   converting $CO_2$ from the stream to CO; and
   cycling the converted CO with the CO produced by partial oxidation to the reactor feed.

* * * * *